United States Patent
Verma et al.

(10) Patent No.: US 11,062,085 B2
(45) Date of Patent: Jul. 13, 2021

(54) GOAL-DRIVEN AUTHORING ASSISTANCE USING CAUSAL STYLISTIC PRESCRIPTIONS

(71) Applicant: Adobe Inc., San Jose, CA (US)

(72) Inventors: Gaurav Verma, Bangalore (IN); Balaji Vasan Srinivasan, Bangalore (IN); Shiv Kumar Saini, Bangalore (IN); Niyati Himanshu Chhaya, Hyderabad (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/694,364

(22) Filed: Nov. 25, 2019

(65) Prior Publication Data

US 2021/0157880 A1    May 27, 2021

(51) Int. Cl.
| | |
|---|---|
| G06F 17/00 | (2019.01) |
| G06F 40/253 | (2020.01) |
| G06F 40/30 | (2020.01) |
| G06F 40/166 | (2020.01) |
| G06F 40/284 | (2020.01) |

(52) U.S. Cl.
CPC .......... *G06F 40/253* (2020.01); *G06F 40/166* (2020.01); *G06F 40/284* (2020.01); *G06F 40/30* (2020.01)

(58) Field of Classification Search
CPC ...... G06F 40/253; G06F 40/30; G06F 40/284; G06F 40/166
See application file for complete search history.

(56) References Cited

U.S. PATENT DOCUMENTS

| | | | |
|---|---|---|---|
| 9,424,533 B1* | 8/2016 | Zadeh | G06F 40/253 |
| 10,529,321 B2* | 1/2020 | Shriberg | G10L 15/22 |
| 2005/0197992 A1* | 9/2005 | Kipersztok | G06F 40/30 |
| | | | 706/50 |
| 2017/0085929 A1* | 3/2017 | Arpteg | G06F 16/783 |
| 2018/0068031 A1* | 3/2018 | Hewavitharana | G06F 16/90328 |
| 2019/0147034 A1* | 5/2019 | Maneriker | G06N 5/022 |
| | | | 704/9 |

(Continued)

OTHER PUBLICATIONS

Wang, Yixin, et al, "The Blessings of Multiple Causes", 2018, pp. 1-16 (Year: 2018).*

(Continued)

*Primary Examiner* — Laurie A Ries
(74) *Attorney, Agent, or Firm* — F. Chau & Associates, LLC

(57) ABSTRACT

A method for generating stylistic feature prescriptions to align a body of text with one or more target goals includes receiving, at a stylistic feature model, a body of text, where the body of text is selected by a user via a graphical user interface (GUI). The stylistic feature model identifies stylistic features from the body of text and populates a stylistic feature vector with the stylistic features. A trained de-confounded prediction model receives the stylistic feature vector. The trained de-confounded prediction model using the stylistic feature vector generates a prediction value for each of one or more target goals, compares the prediction value for each of the one or more target goals to a target value for each of the one or more target goals and outputs, for display on the GUI, one or more stylistic feature prescriptions to the body of text based on results of the comparing.

20 Claims, 8 Drawing Sheets

100

| | | | |
|---|---|---|---|
| Surface 102 | Stylistic element of content that are expressed at surface level | › | • Use of punctuation: commas, semicolons, colons, periods, question mark, exclamation, dashes<br>• Total words in the sentence, unique words in the sentence, average number of characters, average word length |
| Lexical 104 | Stylistic element of content that are expressed by the used vocabulary (words) | › | • Fraction of words that are formal informal, colloquial, literary, concrete, abstract, subjective, objective<br>• Hapax-legomena and Dis-legomen--richness of vocabulary and usage of unfamiliar words |
| Syntactic 106 | Stylistic elements of content that are expressed via structuring of the sentences | › | • Fraction of sentences that have simple, complex, compound, and compound-complex sentences<br>• Fraction of sentences that have loose syntactic structure: height and width of the syntactic parse |

(56) References Cited

U.S. PATENT DOCUMENTS

| | | | | |
|---|---|---|---|---|
| 2019/0311301 | A1* | 10/2019 | Pyati | G06F 16/901 |
| 2019/0392486 | A1* | 12/2019 | Cunico | G06F 16/9535 |
| 2020/0050736 | A1* | 2/2020 | Shayani | G06F 30/17 |
| 2020/0311798 | A1* | 10/2020 | Forsyth | G06F 16/9577 |
| 2020/0349199 | A1* | 11/2020 | Jayaraman | G06F 40/49 |

OTHER PUBLICATIONS

"Generating Forward-looking Insights to Drive Strategy", Gartner Inc., 2019, 10 pages.
Langlotz, A, et al., "(Im)politeness and Emotion", In: Culpeper J., Haugh M., Kádár D. (eds) The Palgrave Handbook of Linguistic (Im)politeness. Palgrave Macmillan, London, 2017, pp. 287-322.
Pearl, Judea, "Causal inference", NIPS 2008 workshop on causality, JMLR Workshop and Conference Proceedings 6:39-58, 2008.
Akhtar et al., "A Multi-task Ensemble Framework for Emotion, Sentiment and Intensity Prediction.", arXiv:1808.0121v2, Oct. 15, 2018, 11 pages.
Balog et al., "Why are they excited? identifying and explaining spikes in blog mood levels." Demonstrations (2006); 4 pages.
Buechel et al., "EMOBANK: Studying the impact of annotation perspective and representation format on dimensional emotion analysis." Proceedings of the 15th Conference of the European Chapter of the Association for Computational Linguistics: vol. 2, 2017, 8 pages.
Dan-Glauser et al., The Difficulties in Emotion Regulation Scale (DERS): Factor Structure and Consistency of a French Translation. Swiss Journal of Psychology, 72(1), 2013, pp. 5-11.
Feng et al., "Characterizing stylistic elements in syntactic structure." Proceedings of the 2012 joint conference on empirical methods in natural language processing and computational natural language learning, 2012; 12 pages.
Liu, "Sentiment analysis and opinion mining." Synthesis lectures on human language technologies 5.1, Apr. 22, 2012, 168 pages.
Mohammad, "Obtaining reliable human ratings of valence, arousal, and dominance for 20,000 English words." Proceedings of the 56th Annual Meeting of the Association for Computational Linguistics (vol. 1: Long Papers), 2018; pp. 174-184.
Preoţiuc-Pietro et al., "Modelling valence and arousal in facebook posts." Proceedings of NAACL_HLT 2016, San Diego, California, Jun. 12-17, 2016, pp. 9-15.
Rao et al., "Dear sir or madam, may i introduce the gyafc dataset: Corpus, benchmarks and metrics for formality style transfer." arXiv:1803.06535v2, Apr. 16, 2018, 15 pages.
Shanahan et al., "Computing attitude and affect in text: Theory and applications." Dordrecht: Springer; Computational Linguistics; vol. 20. Dordrecht, The Netherlands: Springer, 2006, 3 pages.
Wang et al., "The Blessings of Multiple Causes: A Causal Graphical View." 2018, 16 pages.

* cited by examiner

GOAL-DRIVEN AUTHORING ASSISTANCE USING CAUSAL STYLISTIC PRESCRIPTIONS

TECHNICAL FIELD

This description relates to goal-driven authoring assistance using causal stylistic prescriptions.

BACKGROUND

Enterprise content authors write a piece of content to achieve a certain target goal, for example, to achieve higher shareability of content. The target goal can range from improving content consumption, achieving brand conformance, shareability on social media, search-engine optimization for discoverability, improving reading time, comprehensibility, or achieving a target affect or tone (e.g., valence, arousal, dominance) with the reader. Often these target goals are what an enterprise, or an author might want to achieve with the help of the content. Each of these goals would require the author to adopt different style of writing. In these scenarios, authors often look for guiding prescriptions that help them in paraphrasing content to better achieve the target goal. The authors can use such prescriptions to stylistically tune their content to achieve the goal.

For instance, consider the formality in content as a target goal. Intuitively, there are several characteristics that may be used to identify the formality of a piece of text, namely: (i) the manner in which punctuations are used (surface-level style elements), (ii) choice of words—more objective words than subjective words; 'residence' instead of 'home' (lexical-level style elements), and (iii) the way sentences are structured—more syntactically complex sentences than sentences with simple syntax (syntax-level style elements). Thus, formality in text is expressed at various levels, namely, surface, lexical, and syntactic. While these levels of style influencing formality, and the elements within them, are known intuitively, a similar understanding might not be available for several other target goals such as, for example, comprehensibility, shareability, discoverability, consumption, etc. However, having such an intuition at different levels of style can help authors improve their content style to achieve the target goal.

Given the non-trivial extension of stylistic intuitions to sophisticated target-strategies, and a multitude of such target goals in authoring, it is not possible to provide accurate and useful prescriptions for tailoring content towards a goal using a rule-based approach. On the other hand, a conventional function learning approach would also estimate the effect of stylistic elements on target goal, but this will be confounded by latent variables. This calls for a more principled approach for providing such prescriptions.

Within industry in the author assistance space, some focus on the needs of enterprises and some focus on the needs of independent content creators (e.g., authors and editors, specifically). One approach that focuses on the needs of enterprises claims to capture all historic enterprise communications to first understand the implicit enterprise guidelines from the content to provide assistance to content writers. This approach limits suggestions to spellings, grammatical errors, style inconsistencies, use of deprecated terms, etc. While these prescriptions may help in creating content with consistent style aspects, in the absence of a connection to business objectives/goals, they do not help in achieving the enterprise business needs.

One approach that focuses on the needs of independent content creators uses authoring-time assistance features to facilitate individual content writers and has no notion of stylistic guidelines or norms that are specific to an enterprise. Moreover, while politeness and formality can be thought of as target strategies, they do not cover all potential target strategies and extensions to include other target strategies involving access to heavy label-specific, language-based resources, which are not easily available. There has been a growing interest in solving natural language tasks related to style in text. However, these approaches have been limited due to their assumptions about style and its composition. They use stylistic intuitions that are linked to differences in style—be it genre classification, author profiling, social relationship classification, sentiment analysis, readability classification, stylized text generation or style transfer. These assumptions are often task-specific and do not cover all aspects of style leading to a need to fill the gap between the understanding of style and solving tasks related to it. What is needed is a structured way to develop a task-independent understanding of style—that is not tied to any of the above tasks, and is general enough to encompass them.

Other conventional efforts that revolve around style in text, are lacking primarily on two fronts: the focus is on identifying relations between the content and the target goal. These explorations when extended to prescriptive applications for authoring assistance are heavily resource dependent and often inhibitory in terms of cognitive space available to the authors/editors. These established relations between the content and target business strategies are also not causal—therefore, they cannot be directly extended for prescriptions. Aligned with this trend, there has been an abundance of research that aims to leverage supervised learning approaches that range from simple logistic regression models to more sophisticated deep neural networks in order to establish correlations between the observed features of the content (x) and the target variables (y) that quantify target goals. It is well known that causations cannot be inferred from correlations—the strongly correlated features may not necessarily be the ones that influence the target variables. Instead, they may indirectly do so by influencing an unobserved confounder z—a variable that influences both x and y. A need exists to align the process of content creation with target strategies, in a prescriptive setting.

SUMMARY

According to one general aspect, a computer-implemented method for generating stylistic feature prescriptions to align a body of text with one or more target goals includes receiving, at a stylistic feature model, a body of text, where the body of text is selected by a user via a graphical user interface (GUI). The stylistic feature model identifies stylistic features from the body of text and populates a stylistic feature vector with the stylistic features. A trained de-confounded prediction model receives the stylistic feature vector. The trained de-confounded prediction model using the stylistic feature vector generates a prediction value for each of one or more target goals, compares the prediction value for each of the one or more target goals to a target value for each of the one or more target goals and outputs, for display on the GUI, one or more stylistic feature prescriptions to the body of text based on results of the comparing. The above method may be implemented as a computer-implemented method and as a computer program product.

In another general aspect, a system for generating stylistic feature prescriptions to align a body of text with one or more target goals includes at least one memory including instructions and at least one processor that is operably coupled to the at least one memory and that is arranged and configured to execute instructions that, when executed, cause the at least one processor to implement an application. The application includes a graphical user interface (GUI) configured to indicate a selection of a body of text. The application includes a stylistic feature model configured to receive the body of text, identify stylistic features from the body of text, and populate a stylistic feature vector with the stylistic features. The application includes a trained de-confounded prediction model that is configured to receive the stylistic feature vector, generate a prediction value for each of the one or more target goals using the stylistic feature vector, compare the prediction value for each of the one or more target goals to a target value for each of the one or more target goals, and output one or more stylistic feature prescriptions to the body of text based on results of the comparing. The GUI is configured to display the one or more stylistic feature prescriptions to the body of text.

The details of one or more implementations are set forth in the accompa-nying drawings and the description below. Other features will be apparent from the description and drawings, and from the claims.

DETAILED DESCRIPTION

Figure 1:
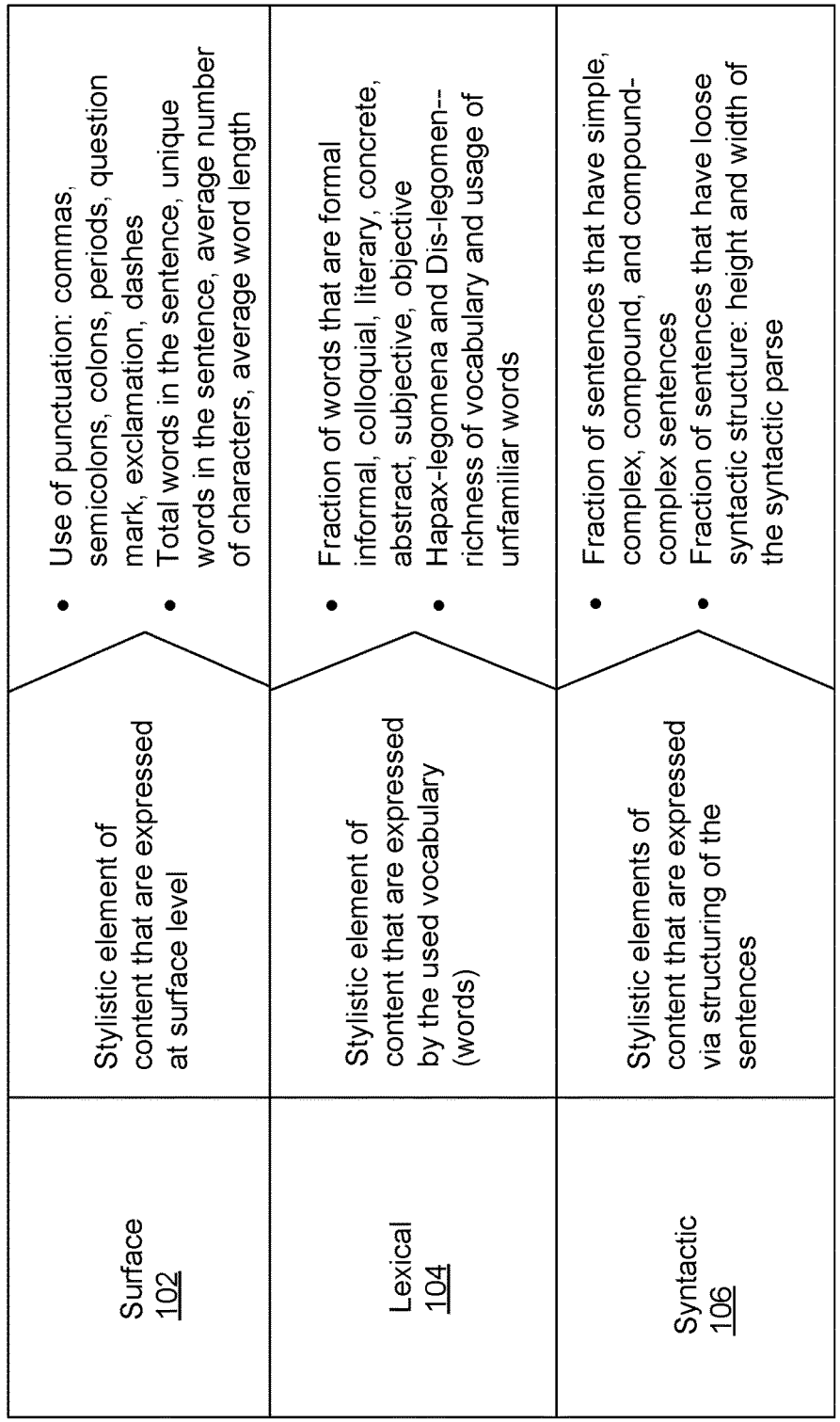
FIG. 1 is an example chart for a stylistic feature structure.

This document describes a technical solution to the above-described shortcoming by providing a causal modeling-based approach to provide prescriptions to authors related to various stylistic aspects of content towards achieving a target goal. Prescriptions, as used herein, are suggestions made to the author for ways to change various stylistic aspects of their content to achieve a target goal. The prescriptions are based on the estimation of causal effects of various stylistic elements (surface, lexical, syntactic) towards the target outcome (i.e., the target goal). By incorporating the prescriptions into the content and changing the content by following the suggestions, the authors can thus compose (or paraphrase) their content in a manner that better aligns with their goals. Such an assistance will also reduce the cognitive load on authors/editors and will provide them with necessary signals to tune their content in the right direction.

In general, given a choice of target goal and its desired value along with the input content (e.g., a body of text), the technical solution uses a structured identification and quan-tification of stylistic elements in text—to qualify the style at surface-level, lexical-level, and syntactic-level. A trained de-confounded prediction model then prescribes changes to different style features of the input content, where the trained de-confounded prediction model has been trained using content that has successfully achieved the target goal in the past. For example, given shareability as a target goal, the algorithm using the trained de-confounded prediction model might suggest the best style to use of exclamations, subjective words, and simple sentences if they have shown success in past content. In this manner, a structured identification and quantification of elements of style is developed and used to train a de-confounded prediction model, which is a causal model of the target goals with respect to these identified style features. Then, the trained de-confounded prediction model is used to provide stylistic feature prescriptions in real-time for a body of text.

Given a choice of target goal and its desired value along with the input content, the technical solution uses a structured identification and quantification of stylistic elements in text—to quantify the style at a surface-level, a lexical level, and a syntactic-level. The model then prescribes changes to different style aspects of the input content based on a causal model of the content that have successfully achieved the target goal in the past. For example, given shareability as a target goal, the algorithm in the technical solution might suggest the best style includes the use of exclamations, subjective words, and simple sentences if they have shown success in past content. Thus, the technical solution includes a structured identification and quantification of elements of style, causal modeling of the target goals with respect to these identified style elements and utilization of this model to provide stylistic prescriptions in real-time.

Within industry, at least one traditional approach provides no real-time feature that can help the author/editor in aligning a piece of text with a target goal that they (or their enterprise) may have in mind. This traditional approach highlights the absence of such features that enable strategic tuning of text to match creators' requirements. The technical solution and approach described in this document addresses this shortcoming of this traditional solution by a causal modeling of target strategies to provide style prescriptions that are specific to the enterprise objective/goal(s).

Within industry, at least one traditional approach provides suggestions that can help creators make the content more polite and formal. However, these suggestions are highly specific to the target variables and the underlying methodology cannot be extended to encompass other target strategies (such as, shareability on social media, search-engine optimization, reading time, comprehensibility, etc.). Further, the suggestions are content-based and not style-based—and require a mapping of lexicons. Moreover, polite and formal cannot be identified on affective dimensions. Politeness and formality have been identified as one of the many factors that bring about certain variations in shareability, discoverability, consumability, reading time, and affect in the reader (which can be identified as one of the target strategies). In this regard, the technical solution described in this document bridges this gap by directly providing causal suggestions to tune content in order to meet the target strategy.

Additionally, at least one traditional approach operates at the level of an individual creator—and hence, doesn't exploit previous publications by an enterprise to implicitly understand their stylistic norms and guidelines. On the other hand, the technical solution described in this document leverages data-driven methods to implicitly model causal-relationships between (a) stylistic aspects that are prominent in previous publications and (b) target strategy at hand, to recommend fine-tuning of content in order to match the strategy that the creator/enterprise has in mind. The technical solution described in this document does not rely on label-specific language-based resources and extends to multiple target strategies. Being a data-driven approach, it implicitly captures the stylistic guidelines and norms that an enterprise adheres to.

Within academia, there has been a lack of clear structure for discussing and identifying stylistic aspects in text. The technical solution described in this document including the demarcation of stylistic aspects into surface, syntactic, and lexical levels facilitates such academic deliberation and identification.

While existing methods aim to establish relations between underlying content of a text and the affect it evokes, the technical solution described in this document aims to establish relations between stylistic aspects of text and the target strategy. In other words, realizations (r) (i.e., sentences) can be dissociated into content (c) and style-related aspects (s). I.e., r=f (c, s). While existing works aim to establish non-causal relations between c and strategy y, the technical solution described in this document establishes causal relations between s and y. Leveraging the relations between c and y in a prescriptive setting is highly dependent on availability exhaustive resources, while leveraging relations between s and y is relatively less demanding. Consider the following example:

For providing a content-based stylistic suggestion (e.g., use the word "tasty" instead of "palatable" for inducing more excitement in the text), one way is to have a mapping of words along the dimension of excitement—this would require plenty of resources—(n−1) mappings for each word, given n affective dimensions along with a lexicon for each of those affective dimensions. However, for providing a style-based suggestion (e.g., use a more subjective words than objective words for inducing more excitement in the text) will require no such requirement of lexical mappings, but only a lexicon for each of the n affective dimensions.

Along with this, style-based stylistic changes (as opposed to content-based stylistic changes) allows the author to understand the deviations in content at a macroscopic level and hence, they have more cognitive space to align the content with the desired target strategy. In this sense, style-based stylistic prescriptions are less restrictive as they provide more cognitive space.

The technical solution aligns the process of content creation with target goals, in a prescriptive setting. To this end, the technical solution overcomes the shortcomings identified above by aiming to establish causal relations between stylistic aspects of content and the target business goal. The technical solution uses a quantification of style elements at different levels along with causal inference to provide stylistic prescription to achieve target goals.

First, a structure for the stylistic features is introduced. FIG. 1 is an example chart 100 for a stylistic feature structure. The chart 100 provides a structured identification and quantification of stylistic features (also referred to interchangeably as stylistic elements) in a body of text. The structure is used to identify and quantify the stylistic features from a given piece of text. In some implementations, the structured identification and quantification of stylistic features includes stylistic features at three different levels—surface-level 102 (also referred to as surface), lexical-level 104 (also referred to as lexical), and syntactic-level 106 (also referred to as syntactic). This structure is first used to train a de-confounded prediction model. Then, the trained de-confounded prediction model is used to provide prescriptions (or suggestions) to a user for how to change an input body of text to meet a target goal by changing the body of text in one or more of these structured stylistic feature categories.

Surface-level stylistic features 102 include stylistic elements of content that are expressed at a surface level. For example, the surface stylistic features 102 include the use of punctuation (commas, semicolons, colons, periods, question marks, exclamations, and dashes). The surface stylistic features 102 also include the total words in the sentence, the unique words in a sentence, the average number of characters in a sentence, and the average word length.

For example, surface-level stylistic variations may include the use of different punctuation, including the use or non-use of Oxford commas. In one example variation, the Oxford comma is used: There are prisons, offices, and colleges. In another example variation, the Oxford comma is not used: There are prisons, offices and colleges. The use or non-use of the Oxford comma is quantified at the surface-level as discussed below.

The surface-level stylistic features 102 may be quantified into multiple features. Each of the features may be numerically quantified. At the surface-level, the number of occurrences of punctuation is quantified into seven (7) features. The occurrences of punctuation features includes commas, semicolons, colons, periods, questions marks, exclamations, and dashes. Other surface-level features including the average total words in a sentence, the average unique words, average characters in a sentence, and average word length, are also quantified. These four (4) features in combination with the seven punctuation features provide a total of eleven (11) surface-level stylistic features 102 that may be quantified.

Lexical-level stylistic features 104 include stylistic elements of content that are expressed by the used vocabulary words. That is, the lexical-level stylistic features 104 look at the particular words that are used in a body of text. The lexical-level stylistic features 104 include word choice and a characterization of the word as formal, informal, colloquial, literary, concrete, abstract, subjective, or objective. The lexical-level stylistic features 104 also include Hapx-legomena and Dis-legomena, meaning the richness of vocabulary and usage of unfamiliar words.

For example, lexical-level variations may include the use of more literary words than colloquial words or the use of more abstract words than concrete words. In the following example, the more colloquial and concrete word "tasty" is used in one variation and the more literary and abstract word "palatable" is used in the other variation. In the first variation: Chocolates, although tasty, can kill you. In the other variation: Chocolates, although palatable, can kill you.

The lexical-level stylistic features 104 may be quantified into multiple features. At word-level, a total of eight (8) features may be quantified. For example, from the body of text being evaluated, the fraction of words of the body of text that are formal, informal, colloquial, literary, concrete, abstract, subjective, and objective are quantified. Additionally, hapax-legomena and dis-legomena words are quantified. That is, words that are considered to be hapax-legomena and dis-legomena, which are features that are indicative of the richness of vocabulary in a given piece of text, are quantified as two (2) features. Thus, a total of ten (10) stylistic features are quantified at the lexical-level.

The syntactic-level stylistic features 106 include stylistic elements of content that are expressed via the structuring of the sentences. Syntactic-level features 106 includes evaluating the type of sentences as simple, complex, compound, and compound-complex. Syntactic-level features 106 also include evaluating sentences that have loose syntactic structure and periodic syntactic structure, including the height and width of the syntactic parse.

For example, syntactic-level variations may include evaluating the sentences in a body of text for piled-up adjectives, detached adjectival clause, and active-passive switch. For instance, in one syntactic-level variation, the sentence "I shall always remember my first visit to Boston" includes certain types of syntactic-level features. In another syntactic-level variation, the sentence "My first visit to Boston will always be remembered" includes other types of syntactic-level features.

The syntactic-level stylistic features 106 may be quantified into multiple features. At syntactic-level the fraction of sentences that have simple, complex, compound-complex, and compound syntactic structure is quantified into fours (4) features. Apart from these, the "loose-ness" and "periodic-ness" of the sentences is quantified into two (2) features by computing the average height and width of syntactic parse trees. At the syntactic-level, a total of six (6) features are quantified.

These quantifications result in a 27-dimensional feature vector (henceforth represented as x) for a given piece of text. The feature vector may be referred to as a stylistic feature vector.

Figure 2:
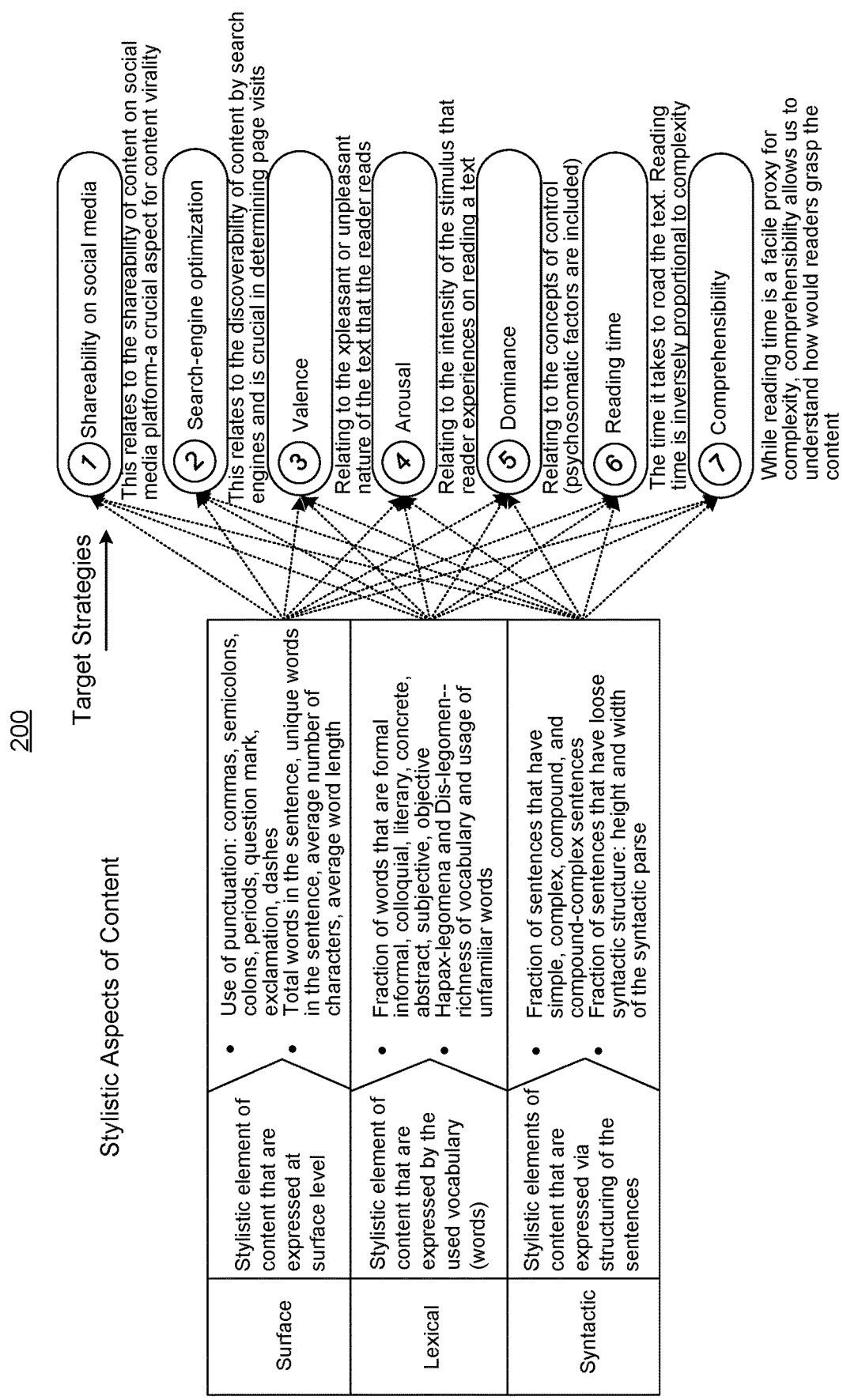
FIG. 2 is an example chart for a stylistic feature structure and target goals.

Given the structure and quantification of stylistic features illustrated in the chart 100 of FIG. 1, one objective is to model the effect of these stylistic features towards one or more target goals. The objective is met by training a de-confounded prediction model, which can then be used to understand which of the stylistic features "contribute" towards the one or more target goals in a causal manner. FIG. 2 is an example chart 200, which shows the stylistic feature structure 100 from FIG. 1 for a stylistic feature structure and a set of target goals. As mentioned, a first objective is to determine which of the stylistic features may have a causal influence on particular target goals.

Chart 200 illustrates multiple target goals. The target goals are goals that an author of a body of text desires to achieve. For example, one target goal for a body of text is shareability on social media. This relates to the shareability of content on social media platforms, which may be a crucial aspect for content virality. Another target goal for a body of text may be search-engine optimization. This relates to the discoverability of content by search engines and is crucial in determining page visits. Another target goal for a body of text may be valence. Valence relates to the pleasant or unpleasant nature of the text that that reader reads. Another target goal for a body of text may be arousal. Arousal relates to the intensity of the stimulus that the reader experience on reading a text. Another target goal for a body of text may be dominance. Dominance relates to the concepts of control that the reader experiences on reading a text. Dominance includes the influence of psychosomatic factors in the body of text. Another target goal is reading time. Reading time relates to the time it takes to read the text. Reading time is inversely proportional to the complexity of the body of text. Finally, another example target goal is comprehensibility. Comprehensibility relates to the readers grasp and understand the text they are reading.

With the stylistic features and target goals in mind, the next step is to train a model that determines and models a causal relationship between the stylistic features and the target goals to understand which stylistic features have a causal influence on particular target goals. Once a model is trained, then the model may be used to generate and provide causal stylistic feature prescriptions that informs the author or creator of content how the content is going to perform based on one or more target goals. The model may suggest changes to the content to better align the stylistic features with the forward-looking target goal for the body of text.

A standard technique in machine learning to train a model is to formulate this as a regression task and use the variable-importance (e.g. β-coefficients in regression models) to provide prescriptions. However, there is a major issue in providing the prescription using such methods: an author chooses to apply a style based on a given piece of content, i.e., the style applied on a piece of content is not randomly chosen. Therefore, if one builds a supervised model that estimates target goals using the style aspects in a corpus without any consideration of the content, the estimate effect of the style on the target metrics will be confounded by the content of the text. In other words, it is possible for the model to attribute a content-imposed element of style to a goal—which will be erroneous. The right approach is therefore to account for the joint effect of such confounders (the aspects of content leading to a style) and the style. However, the aspects of content that lead to a style are usually not observed. If the model is estimated without accounting for the confounders, the size and, potentially, the direction of the effect of alternate styles on target goals will be wrongly estimated.

Figure 3:
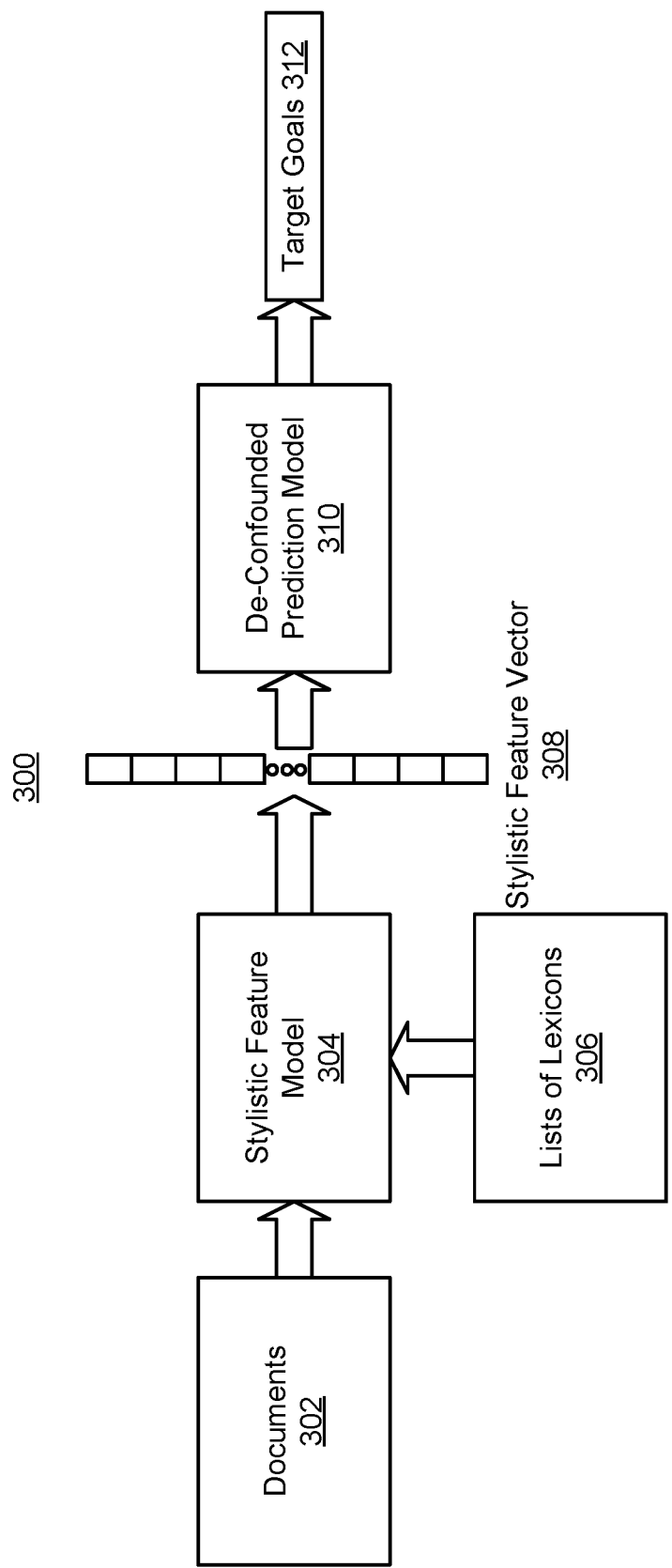
FIG. 3 is a block diagram of an algorithm to model target goals from stylistic features.
Figure 4:
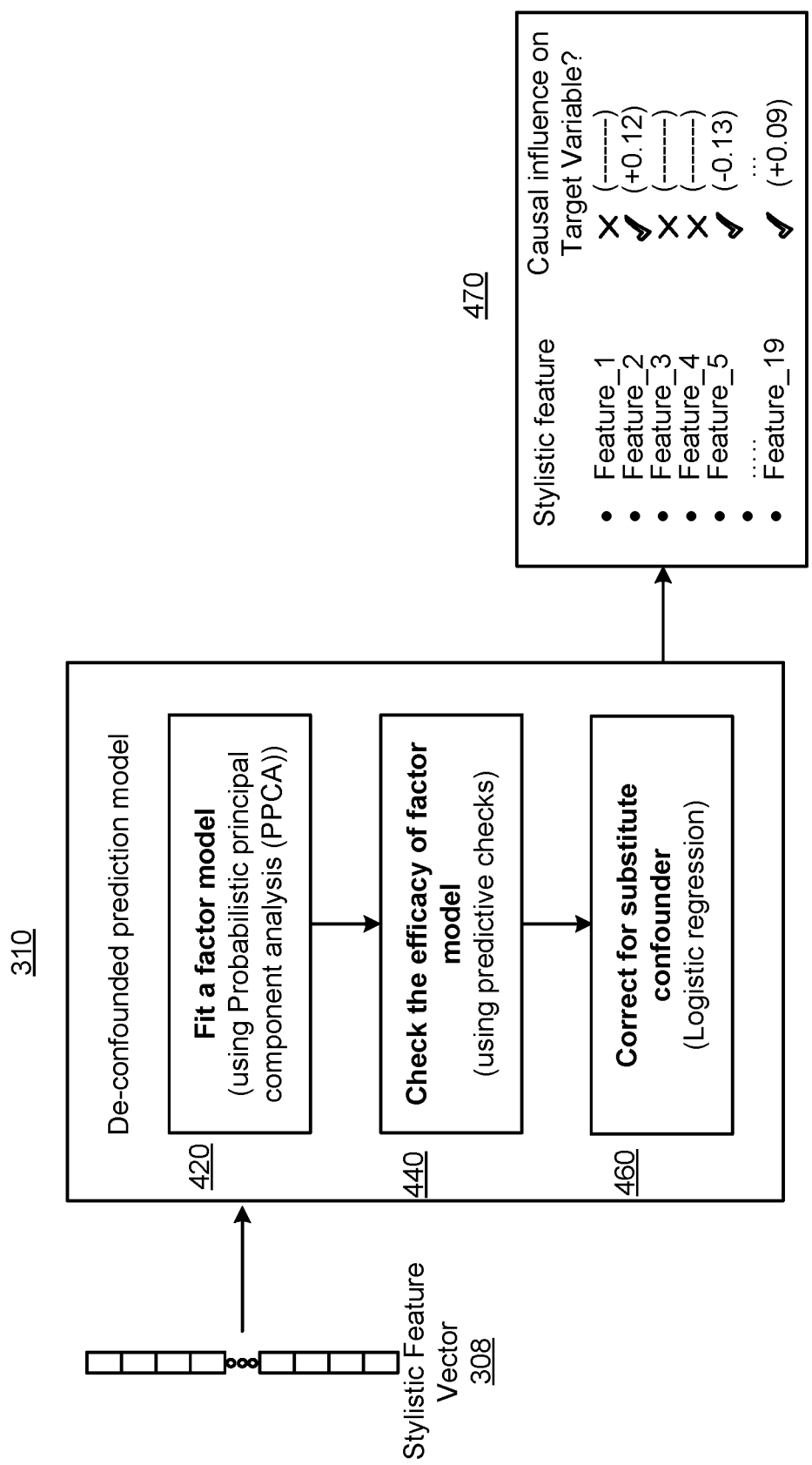
FIG. 4 is a block diagram of the de-confounded prediction model from FIG. 3.

The technical solution for training the model as described below improves upon the standard technique in machine learning. The technical solution below provides an estimate of the confounders and accounts for the confounders to get the correct effect of changes in the style on target strategy metrics. FIGS. 3 and 4 illustrates a technical solution that includes how components interact with each other to provide authoring-time assistance.

FIG. 3 is a block diagram of an algorithm 300 to model target goals from stylistic features. The algorithm 300 provides a process to train a de-confounded prediction model 310. For every target goal to be modeled, a set of documents 302 (e.g., a set of historic content pieces) with the associated metric of interest. For example, the set of documents 302 have a known outcome relative to one or more target goals. With this known set of documents and their achievement of particular target goals, process 300 is used to determine which stylistic features present in the documents 302 have a causal influence on the target goals. In this manner, the de-confounded prediction model 310 can be trained.

In the documents 302 it is known what target goal or target goals the document achieved and the level of that achievement. For instance, it may be known that a body of text in the documents 302 achieved a certain target goal. The body of text may be a social media post and include the number of time the social media post was shared as in indication of the level of shareability of the body of text. Another body of text may include a metric for the length of time the reader spent viewing the body of text as an indication of the reading time target goal.

The documents 302 are input to a stylistic feature model 304. The stylistic feature model 304 is configured to identify stylistic features from the documents 302. In some implementations, the stylistic feature model 304 uses a logistic regression model to extract and identify the stylistic features that are present in the documents 302. To assist in the identification and extraction of the stylistic features, a list of lexicons 306 may be used by the stylistic feature model 304. The stylistic feature model 304 is used to identify a set of the stylistic features from the documents 302, which can be further used to build the de-confounded prediction model 310.

For every content, the style features "x" are extracted. That is, for each body of text in the documents 302, the stylistic features that can be categorized into the features of surface-level, syntactic-level and lexical-level are extracted. The stylistic feature model 304 assigns a numerical value which indicates the presence of the stylistic feature in a body of text. The output of the stylistic feature model 304 is a stylistic feature vector 308, which is a 27-dimensional vector representation of stylistic aspects in text x is used to predict the target goal y based on a logistic regression formulation. It is worth noting that there is no notion of causality so far. This logistical regression model is based on establishing correlation between the features $x_i$ and the target goal y.

Each quantization is one block in the stylistic feature vector. The stylistic feature vector 308 is a representation of the stylistic features for the documents 302.

In the next step, the stylistic feature vector 308 is input into the untrained de-confounded prediction model 310. The next step will involve inferring latent confounders z which will enable establishment of causal relationships between $x_i \in x$ and y. These confounders are hidden reasons (if any) for an author's choice of style—e.g. a topic of "mergers and acquisitions" will force author to use objective words. Another potential confounder could be the topic of the text—it influences both the stylistic aspects x as well as the target strategy y. In order to truly prescribe goal-driven style suggestions, these confounding factors need to be accounted for and their effects need to be removed in the modeling.

FIG. 4 is a block diagram of the de-confounded prediction model 310 from FIG. 3. The process of de-confounding involves inferring and getting rid of such confounding variables—the variables that influence both x and y. It is essentially because in the presence of these confounding variables one cannot correctly infer causations using the identified correlations between $x_i \in x$ and y. However, it's not possible to (a) enumerate and (b) model all the confounding variables. There are three sub-steps for this particular step of our proposed method. First, in step 420, the highly correlated features $x_i \in x$ are excluded and a probabilistic PCA factor model is fit on a training subset of standardized x data. To assess the factor model, predictive check 440 is performed on a held-out x and find that the replicated dataset generated from the probabilistic PCA model given the inferred latent variables, is nearly same as the original dataset (p-value=0.393 for $p(t(x_{n,heldout}^{rep}) < t(x_{n,heldout}))$— where $t(\cdot)$ denotes our test statistics).

If the check was successful, the substitute confounder (z) which was inferred while fitting the factor model is valid, i.e. z is a confounder. As mentioned above, in the context of text, the z could represent various latent variables (like topics) that impact both style (x) and goal (y). Because of difficulty in observing and/or modeling these latent confounding variables, the inferred correlations cannot be trivially extended to causations. Obtaining a valid substitute confounder allows us to correct (460) for such unobserved latent confounders, and consequentially infer causal relationships. To do this correction (460), the substitute confounder is concatenated with the features $x \oplus z$ and fit a logistic regression model on the obtained vectors to predict the target variable y. The confounder-corrected logistic regression model is now the trained de-confounded prediction model 310, which is then used for further causal prescriptions.

These steps are repeated for each of the target goals that are of interest to the enterprise. The result of the above process is a de-confounded prediction model that has learned a function f(x) so that f(x) gives the most accurate value y.

The output of the process 300 is a table 470 for each of the target goals, with an indication of the causal influence of each of the stylistic features on the target goal. The features with an "x" have no causal influence on the particular target goal. The stylistic features with a "check mark" have a causal influence on the particular goal. The table also includes a directionality (+ and −) to indicate the direction of the causal influence on the target goal. For example, a "+" indicates that an increase in the feature will increase the target goal. On the other hand, a "−" indicates that an increase in the feature will decrease the target goal. The number indicates the relative strength of the causal influence on the target goal.

Using the trained de-confounded prediction model, a new body of text can be evaluated against target goals and changes to the body of text can be suggested by the trained de-confounded prediction model in a way that does not change the topic itself. Instead, the model can suggest changes that influence the way in which the topic is conveyed to the reader. The model de-confounds the topic from certain stylistic features on a certain target goal. The de-confounded prediction model learns substitute confounders in a way that separates out the effect of the confounding variables from stylistic features. What remains are not correlations, but causations, because there are no confounders remaining in the model.

Figure 5:
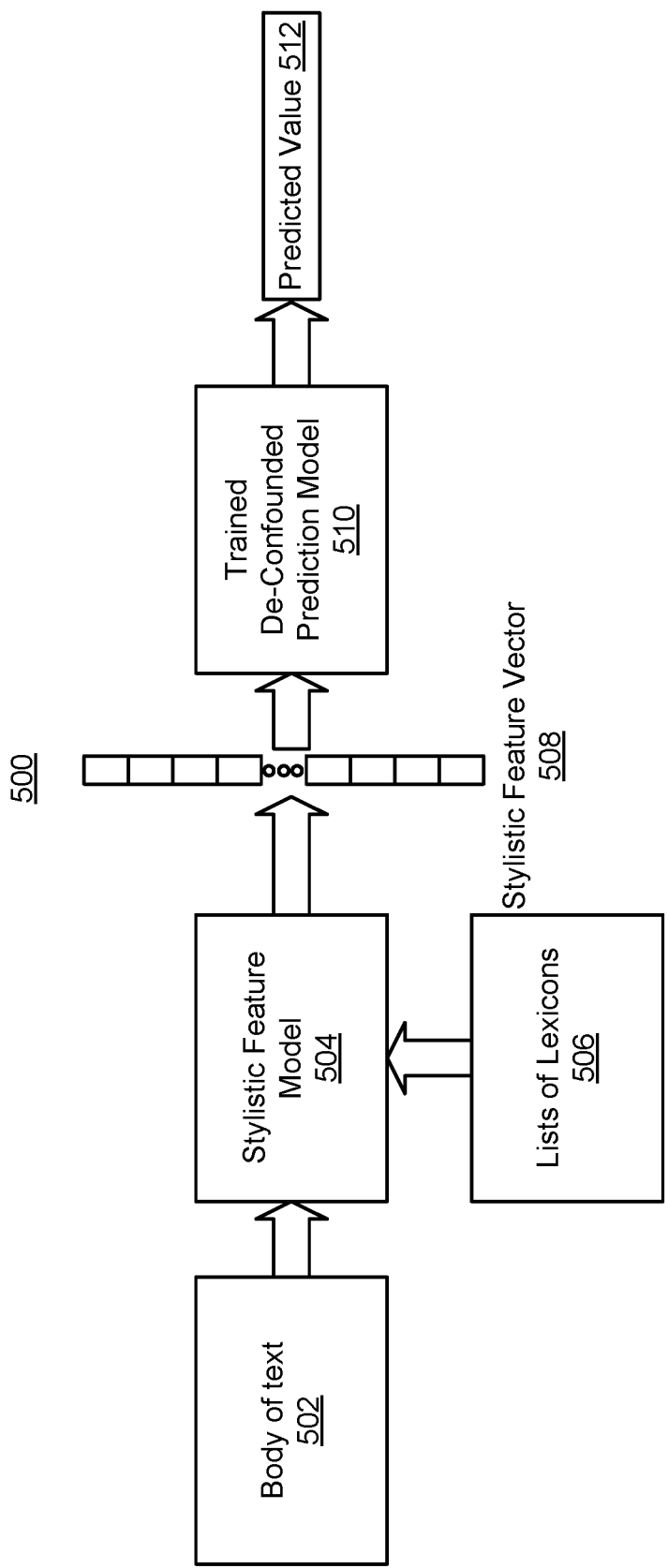
FIG. 5 is a block diagram of an algorithm to prescribe stylistic features to a received body of text.
Figure 6:
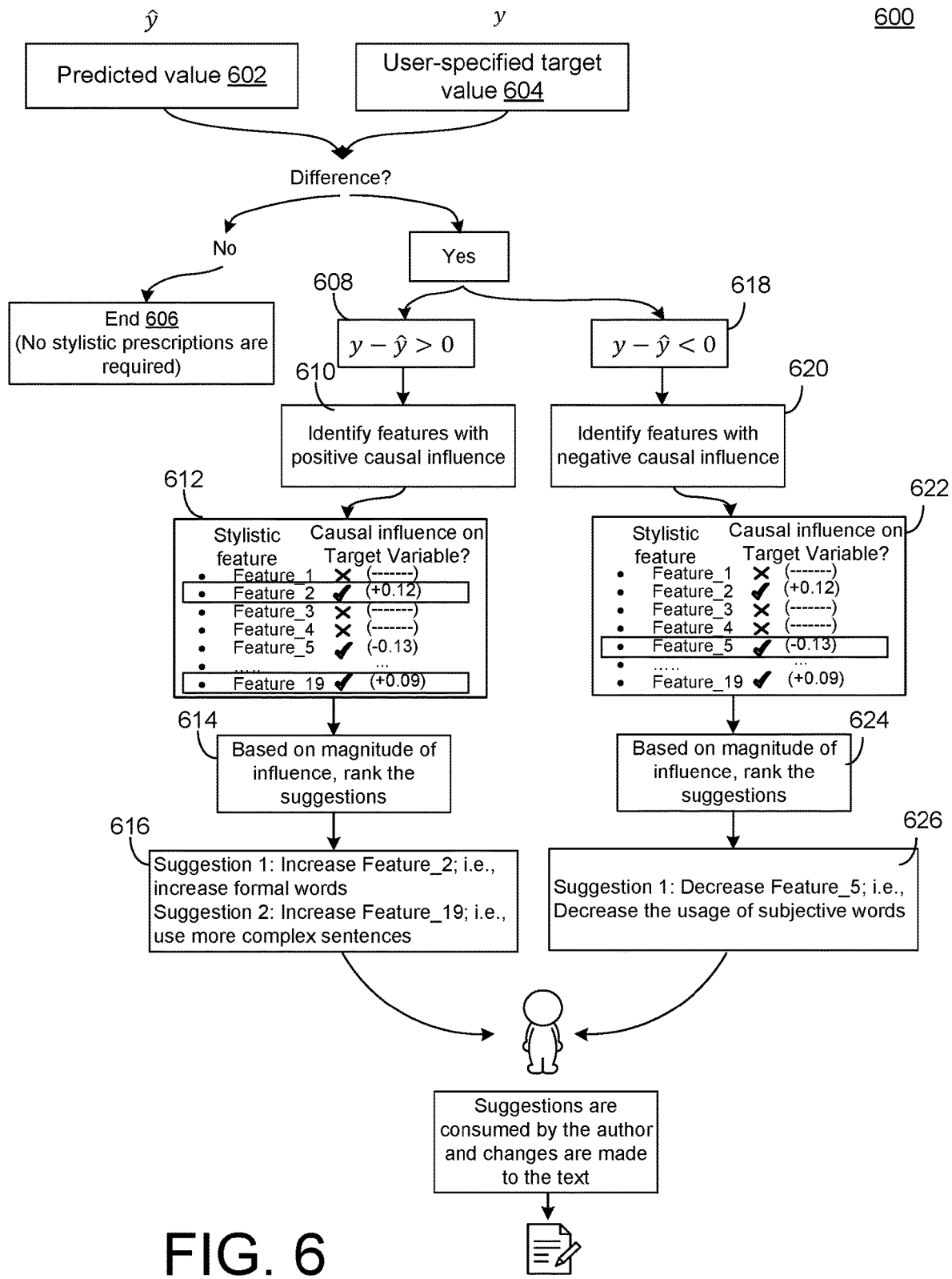
FIG. 6 is a block diagram of an algorithm for difference modeling.

Referring to FIG. 5, a process 500 illustrates using the trained de-confounded prediction model 510 to prescribe suggestions to a body of text to align with desired target goals. Referring also to FIG. 6, a process 600 illustrates the difference modelling performed to determine the specific prescriptions to suggest and output to a graphical user interface (GUI). A body of text 502 is input into the stylistic feature model 504. In this example, the body of text 502 does not have a known outcome for any target goals. Instead, the process 500 evaluates the body of text 502 to determine the current state of aligning with one or more target goals and to make suggestions to alter the current alignment with the target goals.

The stylistic feature model 504 is based on a logistic regression model, which uses a list of lexicons 506 to identify all of the stylistic features present in the body of text 502. The stylistic feature model 504 outputs a stylistic feature vector 508, which is used to predict the target goals for the body of text 502. The stylistic feature vector 508 is input into the trained de-confounded prediction model 510. The trained de-confounded prediction model 510 outputs a predicted value 512 for a particular target goal. The value may or may not be the equal to a user-specified target value. Referring also to FIG. 6, a user may enter a user-specified target value.

The trained de-confounded prediction model 510 performs a comparison between the predicted value 602 and the user-specified target value 604. Depending on the magnitude and directionality of the difference (y-ŷ) between predicted target value ŷ and the user-specified target value y, use the inferred causal relationships to recommend stylistic changes that can reduce the difference between ŷ and y.

For example, if there is no difference between the predicted value 602 and the user-specified target value 604, then that ends the algorithm because no stylistic prescriptions are required 606.

For example, if there is difference where the predicted value is less than the target value 608, then the model identifies stylistic features with positive causal influence 610, such as feature 2 and feature 19 in the table 612. Then, based on the magnitude of the causal influence for the features 614, the stylistic prescriptions are ranked. In this example, the magnitude of feature 2 is larger than the magnitude of feature 19 so feature 2 is ranked higher than feature 19. The model outputs a suggestion 616 on a GUI to increase feature 2 (e.g., increase the formal words) and to increase feature 19 (e.g., use more complex sentences).

If there is a difference where the target value is less than the predicted value 618, then the model identifies the features with a negative causal influence 620, such as feature 5 as identified in table 622. If there is more than one feature, then the features are ranked based on the magnitude of the influence 624. In this example, the model outputs a suggestion 626 on a GUI to decrease feature 5 (e.g., decrease the usage of subjective words).

The usefulness of our identified stylistic features is evaluated by adding them to state-of-the-art models for emotion predictions in a structured manner. Two standard datasets for emotion prediction are considered—The EmoBank dataset and The Facebooks posts dataset. In Table 1, comparisons with multiple baselines illustrate that writing style is a compound factor of several stylistic elements and inclusion of multi-level stylistic features can lead to increased performance on downstream tasks.

TABLE 1

Performance on the emotion prediction task. Multi-level stylistic features ae concatenated with state-of-the-art baselines and compare Pearson coefficient correlation.

| | The EmoBank Dataset | | | FB posts | |
|---|---|---|---|---|---|
| Models | Valence | Arousal | Dominance | Valence | Arousal |
| System [14] | — | — | — | 0.650 | 0.850 |
| Ensemble (CLG) [15] ‡ | 0.635 | 0.375 | 0.277 | 0.727 | 0.355 |
| +lexical | +0.026 | +0.003 | +0.017* | −0.010 | +0.043 |
| +surface | −0.003* | −0.005 | −0.001 | −0.006* | +0.008 |
| +syntactic | +0.012 | +0.006 | +0.002* | +0.004* | +0.009 |
| +all | +0.039 | +0.007 | +0.020 | +0.009 | +0.062 |
| Ensemble (CLG + Our features) | 0.674 | 0.382 | 0.297 | 0.736 | 0.417 |

"+" denotes increase over baseline ‡ due to addition of proposed stylistic features. Underlined values are statistically significant with p < 0.001, while those with * are significant with p < 0.01.

A key consideration for the causal modeling is to miss out on key aspects of the content contributing to the target goal in the pursuit of confounders. One way to evaluate this is to look at the modeling capacity of all the variables against the confounder-corrected subset of features. For the ease of experimental modeling, a given target strategy is quantized into n bins—indicating, for instance, low, medium and high (i.e., 3 bins). This allows the problem to be modeled as an n-class classification problem. The dataset comprises of over 10,000 pieces of text annotated for VAD values. Table 2 shows the performance of the trained logistic regression model, when taking the target strategy to be valence (V), arousal (A) and dominance (D). Table 2 also shows the performance of confounder corrected model—which replicates the vanilla logistic regression—suggesting that there is no loss of information in the process of confounding.

| | Model | | | | | |
|---|---|---|---|---|---|---|
| | Vanilla Logistic Regression | | | Confounder Corrected Factor Model | | |
| Evaluation metric | V | A | D | V | A | D |
| Precision | 0.6113 | 0.5521 | 0.6946 | 0.6105 | 0.6503 | 0.5922 |
| Recall | 0.4884 | 0.5969 | 0.5525 | 0.4936 | 0.5911 | 0.5513 |
| f1-score | 0.5461 | 0.6253 | 0.6112 | 0.5428 | 0.6219 | 0.6101 |
| Was factor model good as reconstructing | | | | Yes (p-value = 0.38) | Yes (p-value = 0.43) | Yes (p-value = 0.37) |

Next, a similar comparison is repeated with the models to predict the formality in a given corpus and report the results in Table 3. This involves changing the target variable y with formality scores, instead of valence, arousal and dominance scores in Table 2.

TABLE 3

Prediction results of a causal logistic regression model for formality (target strategy).

| Evaluation metric | Vanilla Logistic Regression | Confounder Corrected Factor Model |
|---|---|---|
| Accuracy | 0.6406 | 0.6388 |
| Precision | 0.4912 | 0.4903 |
| Recall | 0.5957 | 0.5917 |
| F1-score | 0.5689 | 0.5641 |
| Was factor model good at reconstructing? * | | Yes (p-value = 0.47) |

* Here, p-values are reported for the probability that reconstruction is not within specified bounds. This usage is not aligned with conventional usage of p-values but serves the purpose of establishing the goodness of factor model in reconstruction.

Having established the predictive capabilities of proposed models, some of the stylistic elements that have causal significance with respect to a given target strategy are illustrated in Table 4. The target goals under consideration here are valence, arousal, dominance, and formality. While the first three are affect-related, formality is not. In Table 4, the mismatch is identified in terms of significance of stylistic features as per conventional non-causal models and our proposed causal models.

Table 4 illustrates in red, the stylistic features that were identified as significant by non-causal modeling (i.e., by vanilla logistic regression model) and did not appear as causally significant during causal modeling (i.e., confounder corrected factor model). Similarly, the features in green are the ones that were identified as causally significant by causal-modeling and insignificant by non-causal modeling. The point under consideration is the mismatch between identified significant variables due to difference in modeling—for instance, while use of exclamation and subjective words is identified as significant for formality by conventional modeling, they are not done so by proposed causal modeling. Furthermore, causal-modeling identifies additional stylistic features, like use of complex-syntax, dashes, and periods as causally significant for formality which are missed out by conventional modeling.

Table 4 also qualitatively reinforces the understanding of non-causal modeling. Formality in text, which is an instantiation of target variable y, can be brought about due to the topic which is being wrote about as well as the stylistic elements being used for conveying the information. The conventional model identifies subjective and objective words both as significant for predicting formality, which is in contradiction—subjective and objective words are two ends on the same spectrum; this can be attributed to the unobserved latent variables, like topic, which necessitates such usage. The technical solution of the approached described in this document only identifies one of them, i.e., objective words, as causally significant, and hence, there's no contradiction—this can be attributed to de-confounding latent variables.

Figure 8:
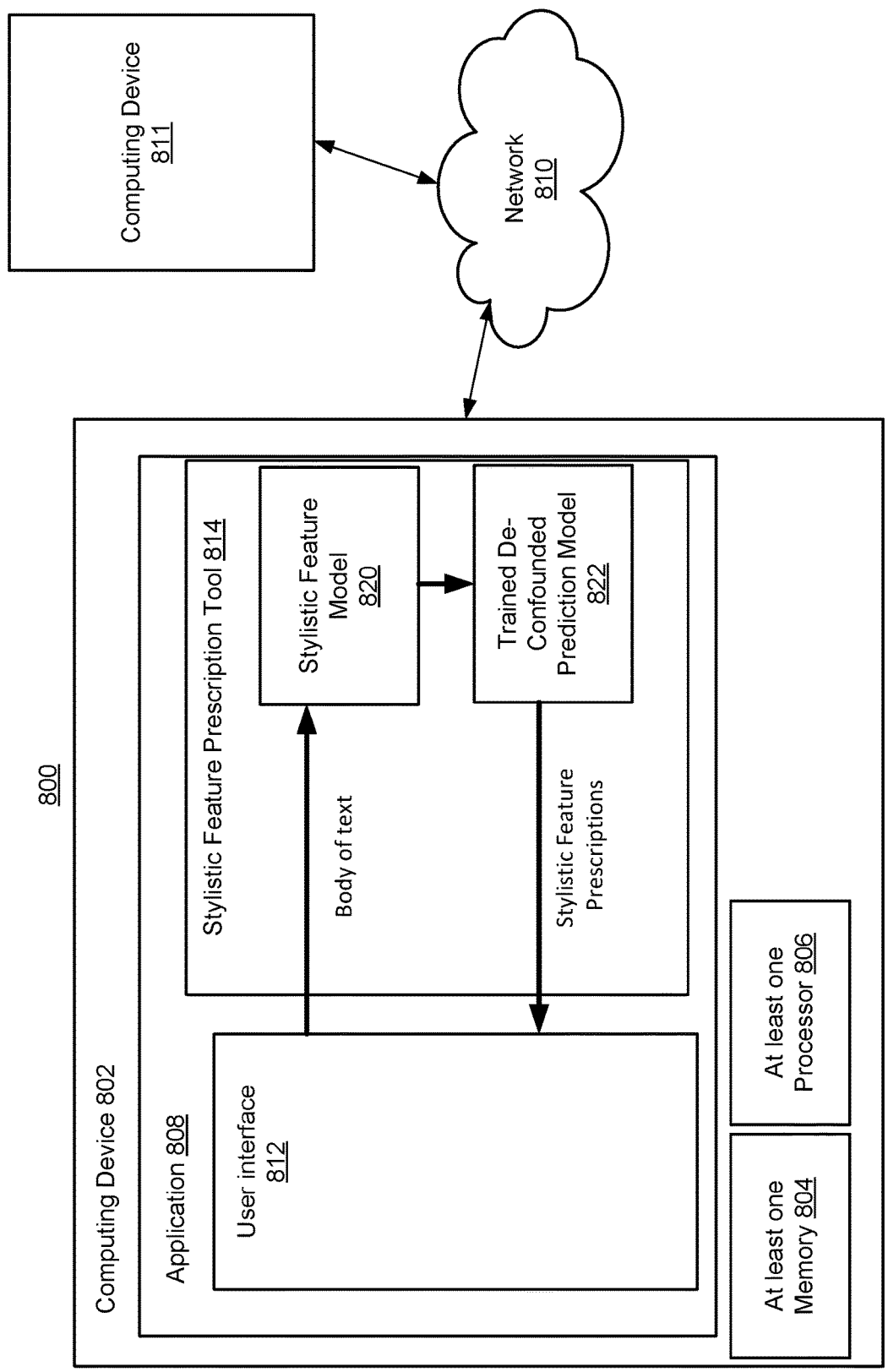
FIG. 8 is an example block diagram of a system for generating stylistic feature prescriptions.

FIG. 8 is a block diagram of a system 800 for generating stylistic feature prescriptions to align a body of text with one or more target goals. The system 800 implements the algorithms 500 and 600 of FIGS. 5 and 6, respectively.

The system 800 includes a computing device 802 having at least one memory 804, at least one processor 806 and at least one application 808. The computing device 802 may communicate with one or more other computing devices over a network 810. For instance, the computing device 802 may communicate with a computing device 811 over the network 810. The computing device 802 may be implemented as a server, a desktop computer, a laptop computer, a mobile device such as a tablet device or mobile phone device, as well as other types of computing devices. Although a single computing device 802 is illustrated, the computing device 802 may be representative of multiple computing devices in communication with one another, such

TABLE 4

Representative instances where some stylistic features might have a mismatch between causal and non-causal significance. Features in red denote mis-identified causal relationships due to a non-causal modeling while the ones in green were left out (but correctly identified due to causal modeling). It's worth noting that the extent of influence also varies.

| Valence | | Arousal | | Dominance | | Formality | |
|---|---|---|---|---|---|---|---|
| Causal Significance | Non-causal Significance | Causal Significance | Non-causal Significance | Causal Significance | Non-causal Significance | Causal Significance | Non-causal Significance |
| Colon Syntax Concrete words Period Dash | Semicolon Syntax Concrete words Period Dash | Subjective words Colon Number of chars Exclamation Concrete words Syntax Period Dash Informal words | Question mark Colon Number of chars Exclamation Concrete words Syntax Period Dash informal words | Abstract Concrete words Exclamation Question mark Syntax | Period Concrete words Exclamation Question mark Syntax | Period Complex-syntax Dash Abstract words Objective words Formal words Question mark | Exclamation Subjective words Objective words Formal words Question mark |

Figure 7:
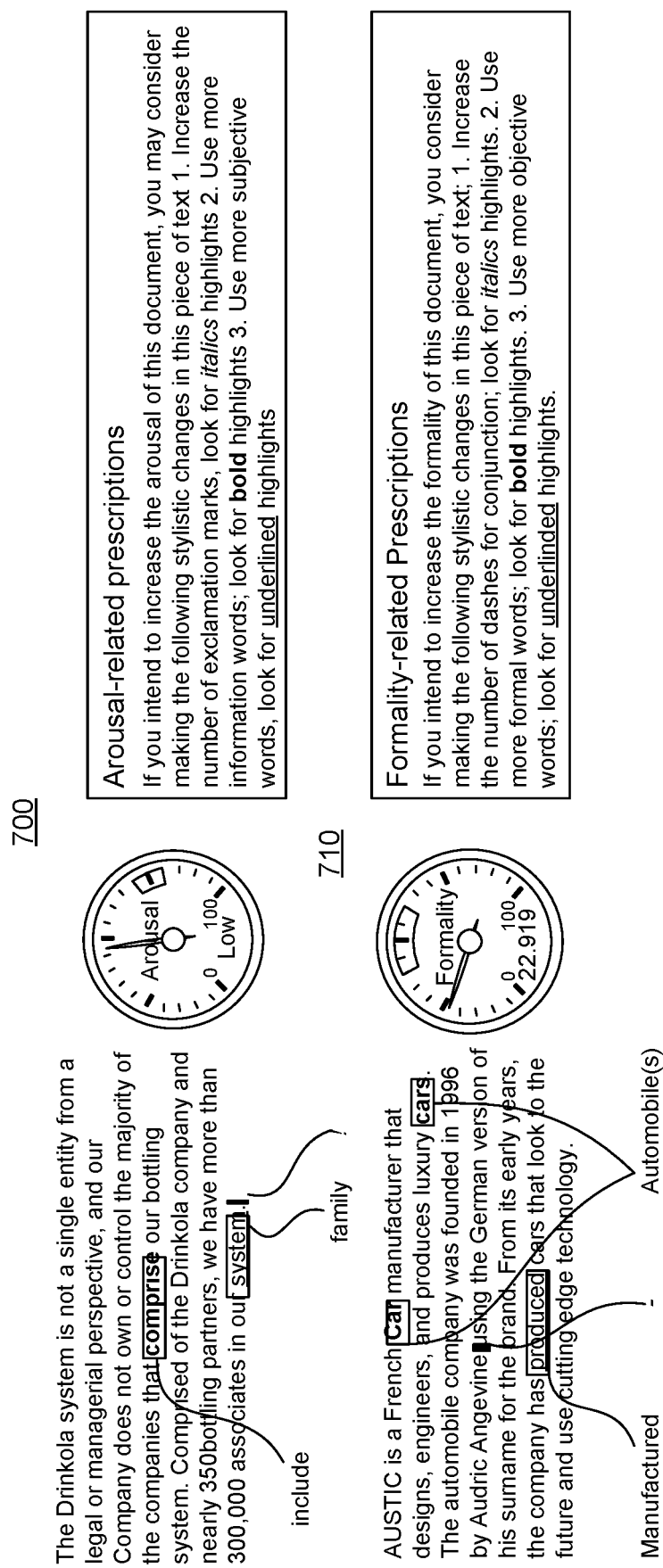
FIG. 7 is an example graphical user interface illustrating prescribed stylistic features for a body of text.

Referring to FIG. 7, an example GUI 700 illustrates a body of text that has been input into the algorithm 500 of FIG. 5. The trained de-confounded prediction model 510 outputs stylistic feature prescriptions to better align the text along the target goal of arousal. For instance, in this example, the target goal is arousal. The body of text is input into the algorithm 500 of FIG. 5. The output from the trained de-confounded prediction model 510 output specific stylistic feature prescriptions to make changes to increase the arousal of the document. For instance, the stylistic feature prescriptions are to increase the number of exclamations mark, use more information words, and to use more subjective words. The body of text is highlighted with indicators (e.g., italics, bold, underline, colors, etc.) corresponding to each of the suggested changes. In some instance, specific words are suggested to replace existing words in the body of the text to achieve the target goal.

An example GUI 710 also illustrates a body of text that has been input into the algorithm 500 of FIG. 5. The output from the trained de-confounded prediction model 510 output specific stylistic feature prescriptions to make changes to increase the formality of the document. For instance, the stylistic feature prescriptions are to increase the number of dashes for conjunctions, use more formal words, and to use more objective words. The body of text is highlighted with indicators (e.g., italics, bold, underline, colors, etc.) corresponding to each of the suggested changes. In some instance, specific words are suggested to replace existing words in the body of the text to achieve the target goal.

as multiple servers in communication with one another being utilized to perform its various functions over a network.

The at least one processor 806 may represent two or more processors on the computing device 802 executing in parallel and utilizing corresponding instructions stored using the at least one memory 804. The at least one processor 806 may include a graphics processing unit (GPU) and/or a central processing unit (CPU). The at least one memory 804 represents a non-transitory computer-readable storage medium. Of course, similarly, the at least one memory 804 may represent one or more different types of memory utilized by the computing device 802. In addition to storing instructions, which allow the at least one processor 806 to implement the application 808 and its various components, the at least one memory 804 may be used to store data, such as one or more of the stylistic feature prescriptions generated by the application 808 and its components used by the application 808.

The network 810 may be implemented as the Internet, but may assume other different configurations. For example, the network 810 may include a wide area network (WAN), a local area network (LAN), a wireless network, an intranet, combinations of these networks, and other networks. Of course, although the network 810 is illustrated as a single network, the network 810 may be implemented as including multiple different networks.

The application 808 may be accessed directly by a user of the computing device 802. In other implementations, the application 808 may be running on the computing device 802 as a component of a cloud network, where a user accesses the application 808 from another computing device over a network, such as the network 810. In one implementation, the application 808 may be a word processing-type application, a comprehensive content management application such as, for example, Adobe Experience Manager, and/or a campaign management application such as, for example, Adobe Campaign. The application may include features that allow users create a body of text, select and set target goals for the body of text, and receive automatically generated stylistic feature prescriptions to align the body of text with the desired target goals. The application may be a standalone application that runs on the computing device 802. Alternatively, the application may be an application that runs in another application such as a browser application.

The application 808 includes a user interface 812, which includes an area to enable the user to manipulate and edit a body of text. One of the many tools of the application 808 includes a stylistic feature prescription tool 814. The application 808 and the stylistic feature prescription tool 814 may implement the algorithm 500 of FIG. 5 and the algorithm 600 of FIG. 6. The stylistic feature prescription tool 814 takes as input a body of text via the user interface 812.

The application 808 includes a user interface 812 also referred to interchangeably as a GUI 812. The user interface 812 is the front facing interface with the application 808 that enables the user to manipulate and edit a body of text including using the stylistic feature prescription tool 814. The stylistic feature prescription tool 814 may be initiated from the user interface 812.

More specifically, a stylistic feature model 820 receives the body of text selected by the user via the GUI 812. The stylistic feature model 820 identifies stylistics features from the body of text and populates a stylistic feature vector with the stylistic features. A trained de-confounded prediction model 822 receives the stylistic feature vector. The trained de-confounded prediction model 822 uses the stylistic feature vector and generates a prediction value for each of the one or more target goals. The trained de-confounded prediction model 822 compares the prediction value for each of the one or more target goals to a target value for each of the one or more target goals. Then, the trained de-confounded prediction model 822 outputs one or more stylistic feature prescriptions to the body of text based on results of the comparing for display on the GUI 812.

In some implementations, the trained de-confounded prediction model 822 includes a table for each of the one or more target goals, where the table for each of the one or more target goals identifies the stylistic features having a causal influence on the target goal for that table. The stylistic features may have no causal influence, a positive causal influence or a negative causal influence on a target goal.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for generating stylistic feature prescriptions to align a body of text with one or more target goals, the method comprising:
   receiving, at a trained de-confounded prediction model, a stylistic feature vector, wherein the stylistic feature vector includes stylistic features from a body of text identified by a stylistic feature model, the stylistic features including surface features, lexical features and syntactic features;
   generating, by the trained de-confounded prediction model using the stylistic feature vector, a prediction value for each of one or more target goals;
   comparing the prediction value for each of the one or more target goals to a target value for each of the one or more target goals; and
   outputting, for display on a graphical user interface (GUI), one or more stylistic feature prescriptions to the body of text based on results of the comparing.

2. The method as in claim 1, wherein the trained de-confounded prediction model includes a table for each of the one or more target goals, wherein the table for each of the one or more target goals identifies the stylistic features having a causal influence on the target goal for that table.

3. The method as in claim 2, wherein the table for each of the one or more target goals identifies the stylistic features having a positive causal influence on the target goal and the stylistic features having a negative causal influence on the target goal.

4. The method as in claim 3, wherein comparing the prediction value for each of the one or more target goals comprises:
   calculating a difference between the prediction value for each of the one or more target goals and the target value for each of the one or more target goals; and
   if the difference is positive, decreasing or increasing the stylistic features based on signs of corresponding weights for the stylistic features from the table for each of the one or more target goals; and
   if the difference is negative, increasing or decreasing the stylistic features based on signs of corresponding weights for the stylistic features from the table for each of the one or more target goals.

5. The method as in claim 2, wherein outputting, for display on the GUI, the one or more stylistic feature prescriptions comprises ranking the one or more stylistic feature prescriptions based on a magnitude of the causal influence for the stylistic features on the target goals.

6. The method as in claim 1, wherein outputting, for display on the GUI, the one or more stylistic feature prescriptions comprises identifying suggested changes to one or more words in the body of text.

7. The method as in claim 1, wherein outputting, for display on the GUI, the one or more stylistic feature prescriptions comprises identifying a new word to replace a word in the body of text.

8. The method as in claim 1, wherein outputting, for display on the GUI, the one or more stylistic feature prescriptions comprises outputting, for display on the GUI, a graphical indication of the one or more target goals.

9. A system for generating stylistic feature prescriptions to align a body of text with one or more target goals, the system comprising:
   at least one memory including instructions; and
   at least one processor that is operably coupled to the at least one memory and that is arranged and configured to execute instructions that, when executed, cause the at least one processor to implement an application, the application comprising:
   a graphical user interface (GUI) configured to indicate a selection of a body of text;
   a stylistic feature model configured to
      receive the body of text,
      identify stylistic features from the body of text, and
      populate a stylistic feature vector with the stylistic features, the stylistic features including surface features, lexical features and syntactic features; and
   a trained de-confounded prediction model that is configured to
      receive the stylistic feature vector,
      generate a prediction value for each of the one or more target goals using the stylistic feature vector,
      compare the prediction value for each of the one or more target goals to a target value for each of the one or more target goals, and
      output one or more stylistic feature prescriptions to the body of text based on results of the comparing, wherein
   the GUI is configured to display the one or more stylistic feature prescriptions to the body of text.

10. The system of claim 9, wherein the trained de-confounded prediction model includes a table for each of the one or more target goals, wherein the table for each of the one or more target goals identifies the stylistic features having a causal influence on the target goal for that table.

11. The system of claim 10, wherein the table for each of the one or more target goals identifies the stylistic features having a positive causal influence on the target goal and the stylistic features having a negative causal influence on the target goal.

12. The system of claim 11, wherein the trained de-confounded prediction model is configured to:
   calculate a difference between the prediction value for each of the one or more target goals and the target value for each of the one or more target goals;
   if the difference is positive, decrease or increase the stylistic features based on signs of corresponding weights for the stylistic features from the table for each of the one or more target goals; and
   if the difference is negative, increase or decrease the stylistic features based on signs of corresponding weights for the stylistic features from the table for each of the one or more target goals.

13. The system of claim 10 wherein:
   the trained de-confounded prediction model is configured to rank the one or more stylistic feature prescriptions based on a magnitude of the causal influence for the stylistic features on the target goals; and
   the GUI is configured to display the ranked stylistic feature prescriptions.

14. The system of claim 9, wherein:
   the trained de-confounded prediction model is configured to identify suggested changes to one or more words in the body of text; and
   the GUI is configured to display the suggested changes to the one or more words in the body of text.

15. The system of claim 9, wherein:
   the trained de-confounded prediction model is configured to identify a new word to replace a word in the body of text; and
   the GUI is configured to display the new word to replace the word in the body of text.

16. The system of claim 9, wherein outputting, for display on the GUI, the one or more stylistic feature prescriptions comprises outputting, for display on the GUI, a graphical indication of the one or more target goals.

17. The system of claim 9 wherein the trained de-confounded prediction model uses a logistic regression model.

18. A method of training a de-confounded prediction model, the method comprising:
- receiving training data including documents having known outcomes for a plurality of target goals;
- generating, using a stylistic feature model, a stylistic feature vector for each of the documents, wherein the stylistic feature vector includes stylistic features from a body of text;
- generating, by a prediction model using the stylistic feature vector, a prediction value for each of the target goals;
- comparing the prediction value for the target goals to the known outcomes; and
- training the prediction model based on the comparison.

19. The method of claim 18, wherein the trained de-confounded prediction model includes a table for each of the one or more target goals, wherein the table for each of the one or more target goals identifies the stylistic features having a causal influence on the target goal for that table.

20. The method of claim 19, wherein the table for each of the one or more target goals identifies the stylistic features having a positive causal influence on the target goal and the stylistic features having a negative causal influence on the target goal.

* * * * *